United States Patent
Mizutani

(10) Patent No.: US 12,275,362 B2
(45) Date of Patent: Apr. 15, 2025

(54) VEHICLE CONTROL SYSTEM, VEHICLE CONTROL METHOD AND CENTRAL ECU

(71) Applicant: TOYOTA JIDOSHA KABUSHIKI KAISHA, Toyota (JP)

(72) Inventor: Taiki Mizutani, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 17/950,783

(22) Filed: Sep. 22, 2022

(65) Prior Publication Data

US 2023/0109523 A1   Apr. 6, 2023

(30) Foreign Application Priority Data

Oct. 5, 2021  (JP) ................. 2021-164309

(51) Int. Cl.
*B60R 16/037* (2006.01)
*B60R 16/023* (2006.01)

(52) U.S. Cl.
CPC ........ *B60R 16/037* (2013.01); *B60R 16/0231* (2013.01)

(58) Field of Classification Search
CPC ........................ B60R 16/037; B60R 16/0231
See application file for complete search history.

(56) References Cited

U.S. PATENT DOCUMENTS

| | | |
|---|---|---|
| 2017/0351532 A1 | 12/2017 | Li et al. |
| 2019/0235888 A1 | 8/2019 | Li et al. |
| 2019/0283775 A1 | 9/2019 | Hirose et al. |
| 2020/0231178 A1 | 7/2020 | Murayama et al. |
| 2021/0284089 A1 | 9/2021 | Yamaguchi et al. |

FOREIGN PATENT DOCUMENTS

| | | |
|---|---|---|
| CN | 112440907 A | 3/2021 |
| JP | 2010-163100 A | 7/2010 |
| JP | 2019-523907 A | 8/2019 |
| JP | 2019-156175 A | 9/2019 |
| JP | 2021-142921 A | 9/2021 |
| WO | 2019/030802 A1 | 2/2019 |

*Primary Examiner* — Michael D Lang
(74) *Attorney, Agent, or Firm* — Oliff PLC

(57) ABSTRACT

A vehicle control system includes a central ECU (Electronic Control Unit), a first ECU and a second ECU. The first ECU outputs an event signal, which expresses that an event relating to a vehicle has occurred, to the central ECU. In response to acquisition of the event signal, the central ECU refers to setting information in which the event and an action which are set in advance, on a per user basis, correspond to one another, and outputs a control signal, which instructs execution of the action corresponding to the event that occurred, to the second ECU. In response to acquisition of the control signal, the second ECU executes the action corresponding to occurrence of the event.

12 Claims, 4 Drawing Sheets

FIG.2

| EVENT | ACTION |
|---|---|
| X | Y |
| ... | ... |
| ... | ... |

VEHICLE CONTROL SYSTEM, VEHICLE CONTROL METHOD AND CENTRAL ECU

CROSS-REFERENCE TO RELATED APPLICATION

This application is based on and claims priority under 35 USC 119 from Japanese Patent Application No. 2021-164309 filed on Oct. 5, 2021, the disclosure of which is incorporated by reference herein.

BACKGROUND

Technical Field

The present disclosure relates to a vehicle control system, a vehicle control method and a central ECU.

Related Art

Personal assistant modules for identifying what response action should be taken in response to a received statement of a user have conventionally been proposed (for example, Japanese Patent Application National Publication No. 2019-523907). The personal assistant module of Japanese Patent Application National Publication No, 2019-523907 is selected non-deterministically so as to be initiated exclusively on a computing device in response to a user statement (refer to the "Abstract" for example).

Further, the vehicle control system of International Patent Application Publication No. 2019/030802 receives input of information by an occupant of a vehicle. At the time when the vehicle selects an action relating to a behavior change of the vehicle with respect to an event occurring while the vehicle is in the midst of traveling, the vehicle control system asks the vehicle occupant about the propriety of execution of control corresponding to the action. Then, the vehicle control system executes control of onboard equipment of the vehicle corresponding to the action, in accordance with information expressing the consent or refusal of the vehicle occupant with respect to the inquiry inputted to the interface.

By the way, at the time when a user is riding in a vehicle for example, it is preferable for some actions relating to the vehicle to be executed automatically in accordance with the habits of the users within the vehicle.

Japanese Patent Application National Publication No. 2019-523907 discloses a voice personal assistant, but does not consider the point of customizing actions within the vehicle per user within the vehicle. Further, in International Patent Application Publication No. 2019/030802, the vehicle control system must ask the vehicle occupant about the propriety of execution of control corresponding to an action.

Therefore, conventional techniques have the problem that, within a vehicle, actions relating to the vehicle cannot be executed per user.

The present disclosure was made in view of the above-described circumstances, and an object thereof is to, within a vehicle, execute actions relating to the vehicle per user.

SUMMARY

In order to achieve the above-described object, a first aspect of the present disclosure is a vehicle control system that includes a central ECU (Electronic Control Unit), a first ECU and a second ECU, wherein the first ECU outputs an event signal, which expresses that an event relating to a vehicle has occurred, to the central ECU, and, in response to acquisition of the event signal, the central ECU refers to setting information in which the event and an action which are set in advance, on a per user basis, correspond to one another, and outputs a control signal, which instructs execution of the action corresponding to the event that occurred, to the second ECU, and, in response to acquisition of the control signal, the second ECU executes the action corresponding to occurrence of the event.

The first ECU of the vehicle control system of the first aspect of the present disclosure outputs an event signal, which expresses that an event relating to a vehicle has occurred, to the central ECU. In response to acquisition of the event signal, the central ECU of the vehicle control system refers to setting information in which the event and an action which are set in advance, on a per user basis, correspond to one another, and outputs a control signal, which instructs execution of the action corresponding to the event that occurred, to the second ECU. In response to acquisition of the control signal, the second ECU of the vehicle control system executes the action corresponding to occurrence of the event. Due thereto, in a vehicle, actions relating to the vehicle can be executed per user. Specifically, due to the setting information being set in advance per user, the action is executed automatically within the vehicle in correspondence with the user. Further, if the setting information is information based on the habits of a user, actions relating to the vehicle can be executed in accordance with the habits of the user.

The central ECU of a vehicle control system of a second aspect of the present disclosure, in response to acquisition of the event signal, selects the second ECU, which is an ECU that executes the action, from among plural ECUs, and outputs a control signal, which corresponds to the occurrence of the event, to the second ECU. In accordance with the second aspect of the present disclosure, the ECU that is responsible for execution of the action is selected appropriately. Further, in accordance with the second aspect of the present disclosure, because the central ECU selects the ECU that is responsible for execution of the action from among plural ECUs, the action that corresponds to the event can be executed via the central ECU, even if the ECU that executes the action and the ECU that detects the event are not in a state of being able to communicate directly.

The setting information of a vehicle control system of a third aspect of the present disclosure is information that is set in advance by a user who uses the vehicle. In accordance with the third aspect of the present disclosure, the setting information can be set in accordance with the preferences of a user who uses the vehicle.

The setting information of a vehicle control system of a fourth aspect of the present disclosure is information that is set in advance, in accordance with a template or history information in which the event and an action, which is carried out in actuality after the event has occurred, correspond to one another. In accordance with the fourth aspect of the present disclosure, the setting information can be set in accordance with the history of actions and events that have actually occurred within the vehicle. Further, in accordance with the fourth aspect of the present disclosure, the setting information can be set in accordance with a template that is prepared in advance.

The second ECU of a vehicle control system of a fifth aspect of the present disclosure executes the action in accordance with a signal outputted from an external server.

In accordance with the fifth aspect of the present disclosure, a predetermined action can be executed in coordination with an external server.

A vehicle control method of a sixth aspect of the present disclosure is a vehicle control method executed by a vehicle control system that includes a central ECU (Electronic Control Unit), a first ECU and a second ECU, and the method includes processings of the first ECU outputting an event signal, which expresses that an event relating to a vehicle has occurred, to the central ECU; in response to acquisition of the event signal, the central ECU referring to setting information in which the event and an action which are set in advance, on a per user basis, correspond to one another, and outputting a control signal, which instructs execution of the action corresponding to the event that occurred, to the second ECU; and in response to acquisition of the control signal, the second ECU executing the action corresponding to occurrence of the event. In accordance with the sixth aspect of the present disclosure, in the same way as in the first aspect, actions relating to the vehicle can be executed per user.

A central ECU (Electronic Control Unit) of a seventh aspect of the present disclosure is a central ECU in a vehicle control system that includes the central ECU, a first ECU and a second ECU, wherein the first ECU outputs an event signal, which expresses that an event relating to a vehicle has occurred, to the central ECU, and, in response to acquisition of the event signal, the central ECU refers to setting information in which the event and an action which are set in advance, on a per user basis, correspond to one another, and outputs a control signal, which instructs execution of the action corresponding to the event that occurred, to the second ECU, and, in response to acquisition of the control signal, the second ECU executes the action corresponding to occurrence of the event. In accordance with the seventh aspect of the present disclosure, in the same way as in the first aspect, actions relating to the vehicle can be executed per user.

As described above, in accordance with the present disclosure, the effect that, within a vehicle, actions relating to the vehicle can be executed per user is obtained.

BRIEF DESCRIPTION OF THE DRAWINGS

FIG. 2 is a drawing illustrating an example of setting information in which events and actions are set in correspondence;

DETAILED DESCRIPTION

Figure 1:
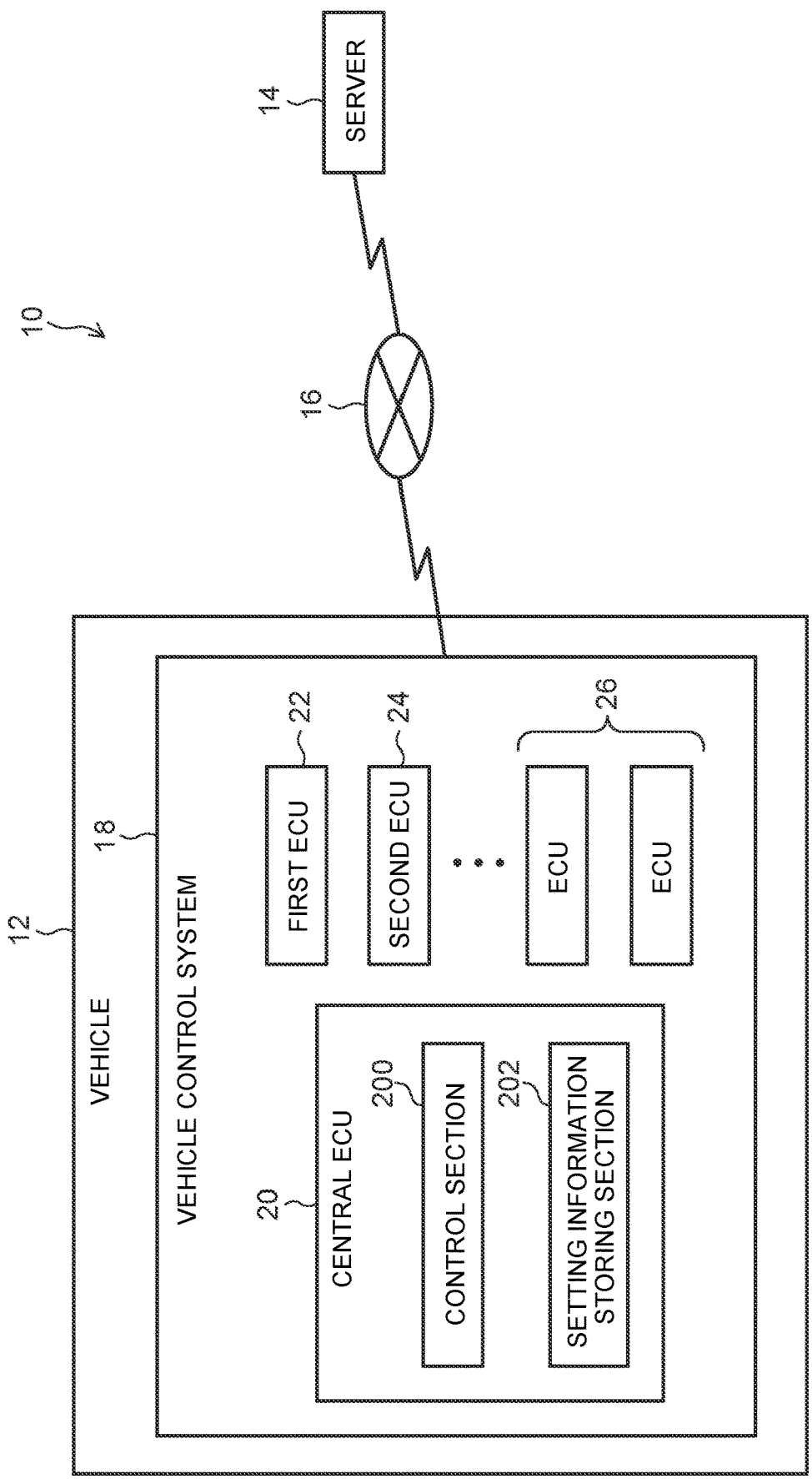
FIG. 1 is a block drawing illustrating an example of functional structures of an information processing system relating to an embodiment.

An embodiment of the present disclosure is described in detail hereinafter with reference to the drawing.

Embodiment

FIG. 1 is a block drawing illustrating an example of functional structures of an information processing system 10 relating to the embodiment. As illustrated in FIG. 1, the information processing system 10 has a vehicle 12 and a server 14. The vehicle 12 and the server 14 are connected so as to be able to communicate through a predetermined communication network 16.

A vehicle control system 18 is installed in the vehicle 12. The vehicle control system 18 has plural ECUs (Electronic Control Units). Specifically, the vehicle control system 18 has a central ECU 20, a first ECU 22, a second ECU 24 and other ECUs 26. The respective ECUs of the vehicle control system 18 control the equipment installed in the vehicle 12.

In order for the plural ECUs installed in the vehicle to coordinate appropriately and execute predetermined information processings, a state in which these plural ECUs can communicate is needed. However, if the number of ECUs installed in the vehicle 12 increases, the wiring for realizing a state in which the plural ECUs can communicate with one another becomes complex.

Thus, the central ECU 20 that can communicate with the plural ECUs is provided in the vehicle control system 18 of the present embodiment. For example, the central ECU 20 has the function of mediating the communications between the first ECU 22 and the second ECU 24. Due thereto, even if wiring that enables direct communication is not provided between the first ECU 22 and the second ECU 24, the first ECU 22 and the second ECU 24 are in a state of being able to communicate via the central ECU 20.

As illustrated in FIG. 1, the central ECU 20 has a control section 200 and a setting information storing section 202.

The control section 200 controls the operations of the central ECU 20.

Figure 2:
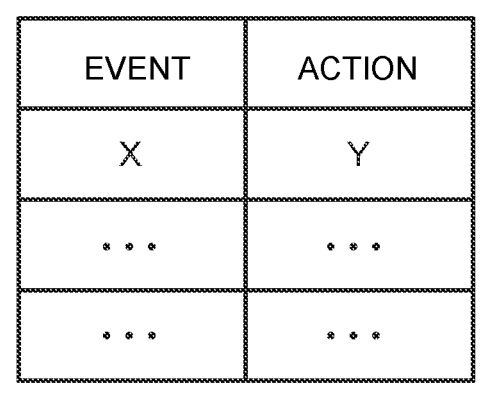

Setting information, in which events and actions relating to the vehicle 12 correspond with one another, is stored in the selling information storing section 202. Note that the setting information is set in advance per user. An example of the setting information that is stored in the setting information storing section 202 is illustrated in FIG. 2. As illustrated in FIG. 2, for example, action Y is made to correspond to a given event X.

Here, an event means a happening that arises at the vehicle 12. Events relating to the vehicle 12 are, for example, happenings such as the engine of the vehicle 12 starts, the vehicle 12 stops, the vehicle 12 starts traveling, and the vehicle 12 is traveling on a highway.

Further, an action is an operation occurring within the vehicle 12. For example, actions are operations such as playing music from a speaker (not illustrated) within the vehicle 12, displaying various information on a display (not illustrated) within the vehicle 12, and locking of the doors (not illustrated) from within the vehicle 12.

Here, it can be expected that a user who is riding in the vehicle 12 will operate the various equipment of the vehicle 12 on the basis of his/her habits. An example is a case in which a given user plays predetermined music immediately upon getting into the vehicle 12.

Thus, in a case in which an event occurs within the vehicle 12, the vehicle control system 18 of the present embodiment specifies the action corresponding to the event that has arisen, on the basis of the setting information per user that is stored in the setting information storing section 202. Then, the vehicle control system 18 outputs a control signal to a predetermined ECU in order for the specified event to be executed. The control signal is an instruction signal expressing execution of the specified event. The ECU that acquires the control signal controls respective equipment such that the event is executed.

Due thereto, actions relating to the vehicle 12 are executed automatically per user within the vehicle 12.

Specifically, in the present embodiment, the setting information is set in advance per user, and therefore, actions are automatically executed per user who is within the vehicle 12. If the setting information is information based on the habits of the users, actions relating to the vehicle can be executed in accordance with the habits of the users.

Note that the setting information in the present embodiment is, for example, set in advance by a user who uses the vehicle 12. For example, a given ECU of the vehicle control system 18 causes a touch panel display (not illustrated) that is within the vehicle 12 to display plural templates in which events and actions are set in correspondence with one another. For example, "start engine" as an event and "play music" as an action correspond to one another in a template. Then, the user selects, as setting information, the template that he/she desires from among these plural templates. Due thereto, setting information per user is set in advance.

Or, for example, the setting information may be set in accordance with history information of the user within the vehicle 12. For example, a case can be contemplated in which the user carries out the action of "playing music" by operating predetermined equipment within the vehicle 12 within a predetermined time period after the event "starting of the engine" has occurred. In this case, for example, the central ECU 20 acquires history information in which the event "starting of the engine" and the action "play music (or start audio equipment)", which is carried out in actuality after that event has occurred, are set in correspondence with one another, and the central ECU 20 sets the setting information in accordance with this history information.

Figure 3:
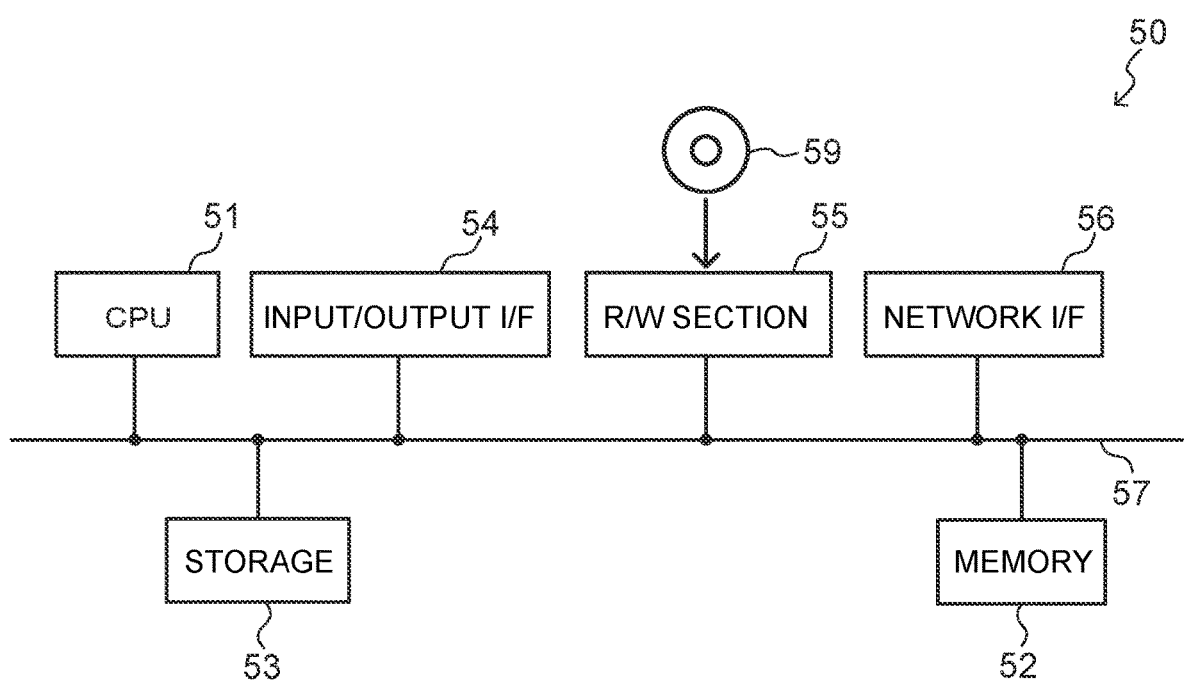
FIG. 3 is a drawing illustrating a structural example of a computer of respective devices relating to the embodiment.
Figure 4:
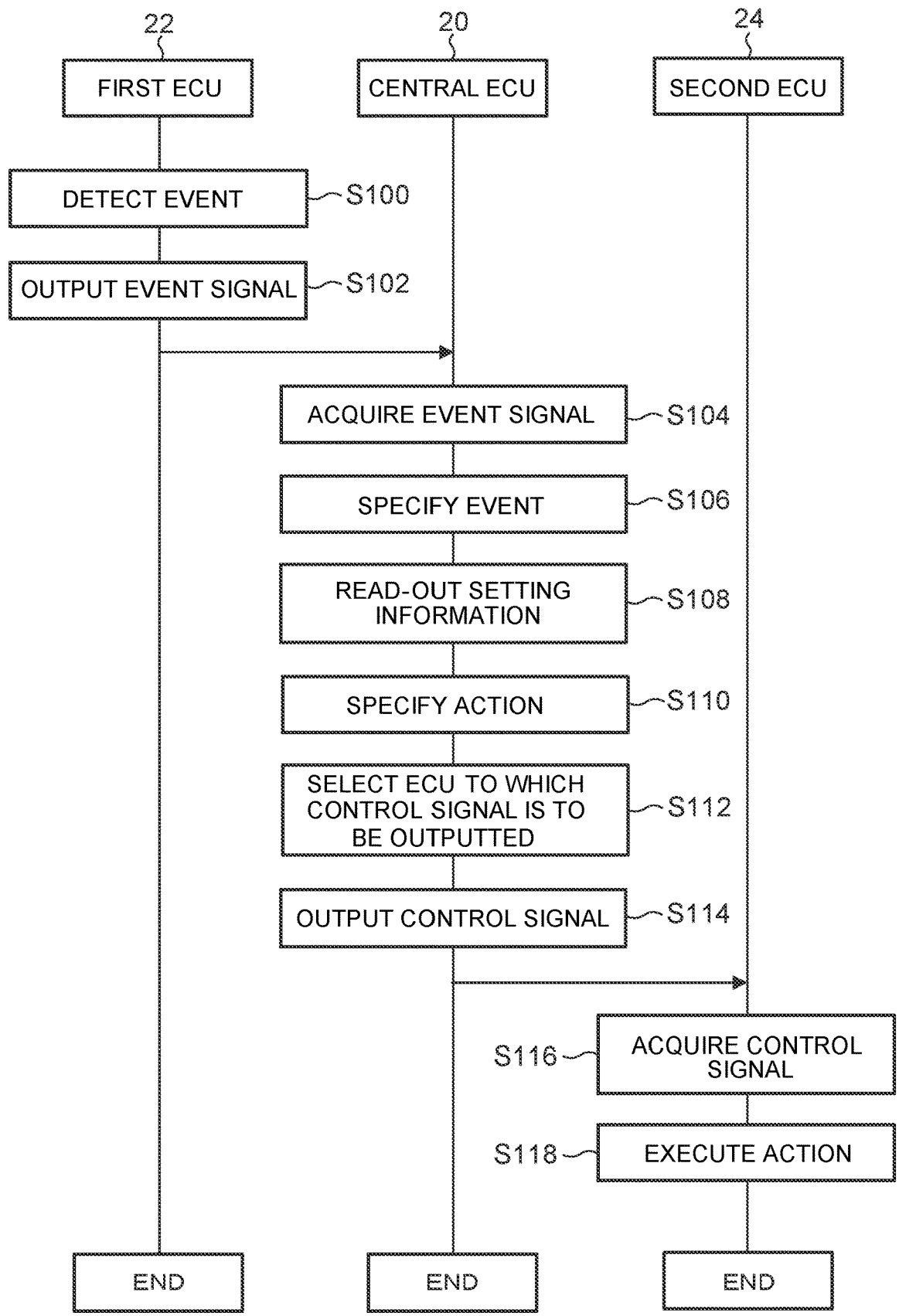
FIG. 4 is a sequence diagram illustrating an example of the flow of processings that are carried out in a vehicle control system relating to the embodiment.

The central ECU 20, the first ECU 22, the second ECU 24 and the server 14 can be realized by, for example, a computer 50 such as illustrated in FIG. 3. The computer 50 has a Central Processing Unit (CPU) 51, a memory 52 that serves as a temporary storage area, and a non-volatile storage 53. Further, the computer 50 has an input/output interface (1/F) 54 to which input/output devices (not illustrated) and the like are connected, and a read/write (R/W) section 55 that controls the reading and writing of data from and to a recording medium 59. Further, the computer 50 has a network I/F 56 that is connected to a network such as the internet or the like. The CPU 51, the memory 52, the storage 53, the input/output I/F 54, the R/W section 55, and the network I/F 56 are connected to one another via a bus 57.

The storage 53 can be realized by a Hard Disk Drive (HDD), a Solid State Drive (SSD), a flash memory or the like. A program for making the computer 50 function is stored in the storage 53 that serves as a storage medium. The CPU 51 reads-out the program from the storage 53, expands the program in the memory 52, and successively executes the processes of the program.

Operation of the vehicle control system 18 of the embodiment is described next.

For example, at the time when the user gets into the vehicle 12, the user operates a terminal (not illustrated) that the user himself/herself has or operates a touch panel display (not illustrated) that serves as an interface for operation and is provided in the vehicle 12, and user authentication is carried out. Due thereto, the user ID of the user riding in the vehicle 12 is specified.

When the first ECU 22, the second ECU 24 and the other ECUs 26 respectively detect an event relating to the vehicle 12, the ECU outputs an event signal, which expresses that that event has occurred, to the central ECU 20.

Note that a case in which the first ECU 22 senses an event and the second ECU 24 executes an action is described hereinafter as an example. Note that, for example, the first ECU 22 is an engine control system ECU that carries out control such as starting of the engine of the vehicle 12 and the like. Further, for example, the second ECU 24 is an audio equipment control system ECU that controls the audio equipment of the vehicle 12.

In step S100, the first ECU 22 detects that a given event has occurred at the vehicle 12. For example, the first ECU 22 detects an event expressing that the engine has started.

In step S102, the first ECU 22 outputs, to the central ECU 20, an event signal expressing that that event occurred in step S100.

In step S104, the control section 200 of the central ECU 20 acquires the event signal outputted from the first ECU 22 in step S102.

In step S106, on the basis of the event signal acquired in step S104, the control section 200 of the central ECU 20 specifies the event that occurred in step S100.

In step S108, on the basis of the user ID obtained by the above-described user authentication, the control section 200 of the central ECU 20 reads-out the setting information that corresponds to the user ID from the setting information storing section 202.

In step S110, the control section 200 of the central ECU 20 refers to the setting information that was read-out in step S108, and specifies the action that corresponds to the event specified in step S106. For example, the control section 200 of the central ECU 20 specifies the action that expresses controlling the audio equipment within the vehicle 12 and playing predetermined music.

In step S112, the control section 200 of the central ECU 20 selects the second ECU, which is the ECU that executes the action specified in step S110, from among the plural ECUs. For example, if the action specified in step S110 is controlling the audio equipment within the vehicle 12 and playing predetermined music, the second ECU that is the audio equipment control system ECU is selected.

In step S114, the control section 200 of the central ECU 20 outputs a control signal, which instructs execution of the action specified in step S110, to the second ECU 24 selected in step S112. For example, the control section 200 of the central ECU 20 outputs a control signal, which instructs that the audio equipment within the vehicle 12 be controlled and predetermined music be played, to the second ECU.

In step S116, the second ECU 24 acquires the control signal that was outputted from the central ECU 20 in step S114.

In step S118, the second ECU 24 executes the action corresponding to the control signal acquired in step S116. For example, the second ECU 24 controls the audio equipment within the vehicle 12 such that predetermined music is played.

Note that, for example, in a case in which the external server 14 coordinates with the vehicle control system 18, the action that the second ECU 24 executes may be executed via the server 14. In this case, the second ECU 24 executes the action in accordance with a signal outputted from the external server 14. For example, in a case in which a music data streaming service is provided by the server 14, the second ECU 24 controls the audio equipment within the vehicle 12, and causes music to be played from the audio equipment in accordance with signals outputted from the server 14.

As described above, the vehicle control system relating to the embodiment includes the central ECU, the first ECU and the second ECU. The first ECU outputs an event signal, which expresses that an event relating to the vehicle has occurred, to the central ECU. In response to the acquisition of the event signal, the central ECU refers to setting information, in which predetermined events and actions that are set in advance per user are set in correspondence with one another, and outputs a control signal, which instructs execution of the action corresponding to the event, to the second ECU. Then, in response to the acquisition of the control signal, the second ECU executes the action corresponding to the occurrence of the event. Due thereto, within the vehicle, actions relating to the vehicle can be executed per user. Further, actions relating to the vehicle can be executed in accordance with the habits of users within the vehicle. Moreover, because the central ECU 20 outputs control signals that are signals instructing actions corresponding to events, actions corresponding to the habits of users within the vehicle can be executed without configuring complex relationships of connection among the plural ECUs.

Note that, although description has been given in which the processings that are carried out by the respective devices in the above embodiment are software processings carried out by executing a program, these processings may be processings carried out by hardware, or may be processings that combine both hardware and software. Further, the program that is stored in the ROM may be stored on any of various storage media and distributed.

Moreover, the present invention is not limited to the above-described embodiment and can, of course, be implemented by being modified in various ways other than the above-described embodiment, within a scope that does not depart from the gist thereof.

All publications, patent applications, and technical standards mentioned in this specification are herein incorporated by reference to the same extent as if each individual publication, patent application, or technical standard was specifically and individually indicated to be incorporated by reference.

What is claimed is:

1. A vehicle control system comprising:
at least one memory;
a first ECU (Electronic Control Unit) including a first processor coupled to the at least one memory;
a second ECU including a second processor coupled to the at least one memory; and
a central ECU including a central processor coupled to the at least one memory, wherein:
the first processor of the first ECU outputs an event signal, which indicates that an event relating to a vehicle has occurred, to the central ECU,
in response to acquisition of the event signal, the central processor of the central ECU (i) accesses setting information based on a user ID of an occupant of the vehicle, the user ID having been specified to the central ECU, the setting information being stored in a storage in association with the user ID, (ii) refers to the setting information that has been accessed and in which the event and an action which are set in advance correspond to one another, and (iii) outputs a control signal, which instructs execution of the action corresponding to the event that occurred, to the second ECU, and
in response to acquisition of the control signal, the second processor of the second ECU executes the action corresponding to occurrence of the event.

2. The vehicle control system of claim 1, wherein, in response to acquisition of the event signal, the central processor of the central ECU selects the second ECU, which is an ECU that executes the action, from among a plurality of ECUs, and outputs the control signal, which corresponds to occurrence of the event, to the second ECU.

3. The vehicle control system of claim 1, wherein the setting information is information that has been input in advance by the occupant who uses the vehicle.

4. The vehicle control system of claim 1, wherein the setting information is information that has been set in advance, in accordance with a template or history information in which the event and an action, which was previously carried out in actuality after the event has occurred, correspond to one another.

5. The vehicle control system of claim 1, wherein the second processor of the second ECU executes the action in accordance with a signal outputted from an external server.

6. A vehicle control method executed by a vehicle control system that includes a first ECU (Electronic Control Unit) including a first processor, a second ECU including a second processor, and a central ECU including a central processor, the method comprising:
the first processor of the first ECU outputting an event signal, which expresses that an event relating to a vehicle has occurred, to the central ECU;
in response to acquisition of the event signal, the central processor of the central ECU (i) accessing setting information based on a user ID of an occupant of the vehicle, the user ID having been specified to the central ECU, the setting information being stored in a storage in association with the user ID, (ii) referring to the setting information that has been accessed and in which the event and an action which are set in advance correspond to one another, and (iii) outputting a control signal, which instructs execution of the action corresponding to the event that occurred, to the second ECU; and
in response to acquisition of the control signal, the second processor of the second ECU executing the action corresponding to occurrence of the event.

7. The vehicle control system of claim 1, wherein a plurality of sets of the setting information are stored in the storage in association with different user IDs.

8. The vehicle control method of claim 6, wherein a plurality of sets of the setting information are stored in the storage in association with different user IDs.

9. The vehicle control method of claim 6, wherein, in response to acquisition of the event signal, the central processor of the central ECU selects the second ECU, which is an ECU that executes the action, from among a plurality of ECUs, and outputs the control signal, which corresponds to occurrence of the event, to the second ECU.

10. The vehicle control method of claim 6, wherein the setting information is information that has been input in advance by the occupant who uses the vehicle.

11. The vehicle control method of claim 6, wherein the setting information is information that has been set in advance, in accordance with a template or history information in which the event and an action, which was previously carried out in actuality after the event has occurred, correspond to one another.

12. The vehicle control method of claim 6, wherein the second processor of the second ECU executes the action in accordance with a signal outputted from an external server.

* * * * *